United States Patent
Menheere et al.

(10) Patent No.: US 10,329,955 B2
(45) Date of Patent: Jun. 25, 2019

(54) OIL SYSTEM FOR TURBINE ENGINE AND RELATED METHOD

(71) Applicant: Pratt & Whitney Canada Corp., Longueuil (CA)

(72) Inventors: David Menheere, Norval (CA); Andrew Marshall, Grand Valley (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 821 days.

(21) Appl. No.: 15/007,527

(22) Filed: Jan. 27, 2016

(65) Prior Publication Data

US 2017/0211477 A1   Jul. 27, 2017

(51) Int. Cl.
| | | |
|---|---|---|
| *F01D 25/20* | (2006.01) | |
| *F02C 7/36* | (2006.01) | |
| *H02P 29/20* | (2016.01) | |
| *F01D 19/00* | (2006.01) | |
| *F02C 7/32* | (2006.01) | |
| *H02P 101/00* | (2015.01) | |

(52) U.S. Cl.
CPC ............ *F01D 25/20* (2013.01); *F01D 19/00* (2013.01); *F02C 7/32* (2013.01); *F02C 7/36* (2013.01); *H02P 29/20* (2016.02); *F05D 2260/98* (2013.01); *H02P 2101/00* (2015.01)

(58) Field of Classification Search
CPC ........ F01D 25/20; F01D 25/18; F01D 25/125; F01D 25/16; F01D 19/00; F02C 7/32; F02C 7/36; F02C 7/26; H02P 29/20; H02P 2101/00; F05D 2260/98
See application file for complete search history.

(56) References Cited

U.S. PATENT DOCUMENTS

| | | | |
|---|---|---|---|
| 4,431,372 A | 2/1984 | Dadhich | |
| 5,555,722 A | 9/1996 | Mehr-Ayin et al. | |
| 7,690,205 B2 | 4/2010 | Delaloye et al. | |
| 7,805,947 B2 * | 10/2010 | Moulebhar | F01D 21/003 60/39.163 |
| 8,312,728 B2 | 11/2012 | Cloft et al. | |
| 8,887,869 B2 | 11/2014 | Pisseloup | |
| 9,140,194 B2 | 9/2015 | Ertz et al. | |
| 2006/0054406 A1 * | 3/2006 | Delaloye | F01D 25/18 184/6.11 |
| 2006/0260323 A1 * | 11/2006 | Moulebhar | F01D 21/003 60/793 |
| 2009/0101444 A1 * | 4/2009 | Alecu | F01D 25/18 184/11.2 |

(Continued)

*Primary Examiner* — Michael R Mansen
*Assistant Examiner* — Robert T Reese
(74) *Attorney, Agent, or Firm* — Norton Rose Fulbright Canada LLP

(57) ABSTRACT

An oil system of a turbine engine and a method for driving an oil pump of such oil system are disclosed. In various embodiments, the oil system comprises an oil pump for fluid communication with one or more lubrication loads of the turbine engine, a first source of motive power and a coupling device. The first source of motive power is drivingly engaged to the oil pump for driving the oil pump during a first mode of operation. The coupling device is configured to drivingly disengage a second source of motive power from the oil pump during the first mode of operation and drivingly engage the second source of motive power with the oil pump to drive the oil pump during a second mode of operation.

20 Claims, 2 Drawing Sheets

(56) References Cited

U.S. PATENT DOCUMENTS

| | | | | |
|---|---|---|---|---|
| 2014/0150440 | A1* | 6/2014 | Suciu | F02C 7/236 60/772 |
| 2018/0045119 | A1* | 2/2018 | Sheridan | F02C 7/275 |
| 2018/0298777 | A1* | 10/2018 | Nguyen | H02J 7/00 |

* cited by examiner

OIL SYSTEM FOR TURBINE ENGINE AND RELATED METHOD

TECHNICAL FIELD

The disclosure relates generally to an oil system of a turbine engine, and more particularly to supplying lubrication loads of a turbine engine during different modes of operation of the turbine engine.

BACKGROUND OF THE ART

Conventional practice on a multi-spool gas turbine engine is to have the engine oil pump driven via the high-pressure spool of the engine. During start-up, the high-pressure spool usually turns before the low-pressure spool which drives the load so this ensures that sufficient oil pressure is available to bearings associated with the rotation of the low-pressure spool as soon as possible during the operation of the gas turbine engine to achieve good bearing life and reliability. However, in some situations or for engine types where the low-pressure spool of the multi-spool gas turbine engine would be driven before or without necessarily having to drive the high-pressure spool, arrangements where the engine oil pump is driven via the high-pressure spool may not be optimal.

SUMMARY

In one aspect, the disclosure describes a turboprop gas turbine engine comprising:
a shaft configured to be driven by a turbine;
a gear train system configured to transfer power from the shaft to a propeller coupled to the turbine engine; and
an oil system comprising:
an oil pump in fluid communication with one or more lubrication loads of the turbine engine;
a first electric motor drivingly engaged to the oil pump for driving the oil pump during a first mode of operation; and
a coupling device configured to:
drivingly disengage the gear train system from the oil pump during the first mode of operation; and
drivingly engage the gear train system to the oil pump to drive the oil pump with the gear train system during a second mode of operation.

In another aspect, the disclosure describes an oil system of a turbine engine. The oil system comprises:
an oil pump for fluid communication with one or more lubrication loads of the turbine engine;
a first source of motive power drivingly engaged to the oil pump for driving the oil pump during a first mode of operation; and
a coupling device configured to:
drivingly disengage a second source of motive power from the oil pump during the first mode of operation; and
drivingly engage the second source of motive power to the oil pump to drive the oil pump with the second source of motive power during a second mode of operation.

In a further aspect, the disclosure describes a method for driving an oil pump in fluid communication with one or more lubrication loads of a gas turbine engine. The method comprises:

driving the oil pump with a first source of motive power during a first mode of operation where the oil pump is drivingly disengaged from a second source of motive power;
drivingly engaging the second source of motive power to the oil pump; and
driving the oil pump with the second source of motive power during a second mode of operation.

Further details of these and other aspects of the subject matter of this application will be apparent from the detailed description and drawings included below.

DESCRIPTION OF THE DRAWINGS

Reference is now made to the accompanying drawings, in which.

DETAILED DESCRIPTION

The present disclosure relates to an oil system of a turbine engine. In various embodiments, the oil system may be configured to supply oil to bearings or other lubrication loads of the turbine engine during different modes of operation of the turbine engine by driving an oil pump using different power sources during the different modes of operation. For example, in some embodiments, the oil pump may be configured to pressurize oil for delivery to one or more lubrication loads of a turbine engine where the oil pump is driven by an electric motor when an operating speed of the gear train system is low, and where the oil pump is driven by the gear train system when the operating speed of the gear train system is high. In some embodiments, the oil system disclosed herein may be useful before or during start-up of the turbine engine. In some embodiments, the oil system disclosed herein may be useful in hybrid gas/electric turbine engines where an output shaft of such hybrid turbine engine may be driven by an electric motor in some mode(s) of operation. In some embodiments, oil systems as disclosed herein may provide adequate oil supply and pressure to the associated lubrication loads and contribute toward improved life and reliability of such lubrication loads (i.e., components).

Aspects of various embodiments are described through reference to the drawings.

Figure 1:
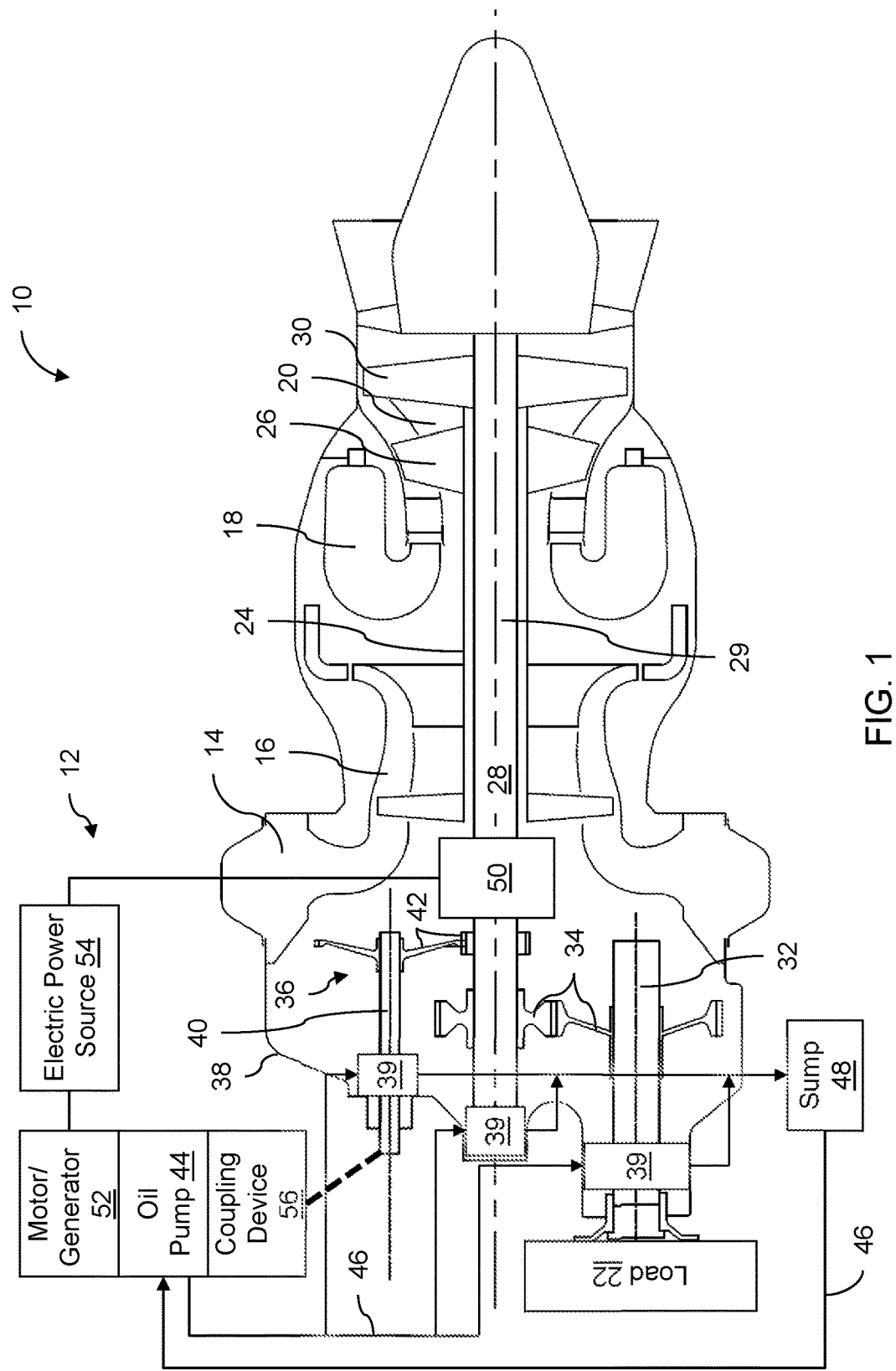
FIG. 1 shows a schematic axial cross-section view of an exemplary gas turbine engine of the turboshaft or turboprop type comprising an oil system as described herein.

FIG. 1 shows a schematic axial cross-section view of an exemplary turbine engine 10 of known or other type but comprising oil system 12 as described herein. In various embodiments, turbine engine 10 may be of the turboshaft or turboprop type. In some embodiments, turbine engine 10 may be of the hybrid gas/electric type or, alternatively, may be of the non-hybrid (e.g., gas) type. For example, turbine engine 10 may be of a type suitable for use in subsonic flight, generally comprising in serial flow communication inlet 14 through which ambient air is received, multistage compressor 16 for pressurizing the air, combustor 18 in which the compressed air is mixed with fuel and ignited for generating an annular stream of hot combustion gases, and turbine section 20 for extracting energy from the combustion gases. Turbine engine 10 may be of a type suitable for aircraft applications and may configured for operation as a turboprop engine. Turbine engine 10 may be used to power load 22, which may include for example, a helicopter main rotor or one or more propellers of a fixed-wing aircraft. Alternatively, turbine engine 10 may be used for a ground-based industrial application such as power generation and may be configured for operation as a turboshaft engine.

Turbine engine 10 may have a dual-spool configuration but it is understood that turbine engine 10 may not be limited to such configuration. For example, engine 10 may comprise high-pressure spool 24 including one or more stages of multistage compressor 16 and one or more high-pressure turbines 26 of turbine section 20. Engine 10 may also comprise low-pressure shaft 28, which may be part of low-pressure spool 29 driven by one or more low-pressure (i.e., power) turbines 30 of turbine section 20. Low-pressure shaft 28 may be mechanically coupled to output shaft 32 via gears 34, to which mechanical load 22 such as a propeller and/or a main rotor of an aircraft may be coupled. Gears 34 may be considered part of gear train system 36 housed within gear box 38. In some embodiments for aircraft applications for example, gear train system 36 may be of the speed-reducing type where the rotational speed of output shaft 32 may be lower than the rotational speed of low-pressure shaft 28 when motive power is transferred from low-pressure shaft 28 to output shaft 32.

Turbine engine 10 may also comprise one or more accessory drive shafts 40 that may be used to drive various accessories of turbine engine 10 such as one or more electric generators, oil pump(s) and/or other aircraft-related accessory(ies). Accessory drive shaft 40 may be driven by (e.g. drivingly engaged to) low-pressure shaft 28 via gears 42 or other suitable power-transfer means which may be considered part of gear train system 36.

Turbine engine 10 may comprise one or more lubrication loads 39 such as bearings and gears 34, 42 that require lubrication. Oil to such lubrication loads 39 may be supplied by oil system 12 as explained below. Such lubrication loads 39 may be part of gear train system 36 or of other part(s) of turbine engine 10. In some embodiments, one or more of lubrication loads 39 may be journal bearings which may be part of gear train system 36 and which may require oil pressure during their operation.

Oil system 12 may serve to lubricate, cool and clean bearings and/or gears 34, 42 of turbine engine 10. Oil system 12 may comprise oil pump 44 configured to pressurize oil for delivery to one or more lubrication loads 39 of turbine engine 10. Accordingly, oil pump 44 may be in fluid communication with lubrication load(s) 39 via one or more conduits 46 (e.g., tubes, hoses) for carrying oil to the associated lubrication load(s) 39. Oil system 12 may comprise sump 48 which collects oil from lubrication loads 39 and from which the oil may be returned to oil pump 44 for recirculation. It is understood that oil system 12 may also comprise other components such as, for example, one or more oil filters, scavenge pump(s) and a breather system of known or other types and which are not illustrated or further described herein.

Oil system 12 may be configured to supply oil to one or more lubrication loads 39 during different modes of operation of turbine engine 10. For example, oil system 12 may be configured to supply oil when high-pressure spool 24 of turbine engine 10 is not being driven or is being driven at a relatively low speed. Similarly, oil system 12 may be configured to supply oil when low-pressure shaft 28 of low-pressure spool 29 of turbine engine 10 is not being driven or is being driven at a relatively low speed. Accordingly, oil system 12 may be configured to supply oil to one or more lubrication loads 39 irrespective of the operating speed of high-pressure spool 24 and/or of low-pressure spool 29. For example, in various embodiments, oil pump 44 may be driven independently of high-pressure spool 24 and/or independently of low-pressure spool 29. For example, in some embodiments described below, oil pump 44 may be driven by a first source of motive power (e.g., electric motor, hydraulic motor, pneumatic motor, rotating/driven shaft) during a first mode of operation of turbine engine 10 and be driven by a second source of motive power (e.g., electric motor, hydraulic motor, pneumatic motor, rotating/driven shaft) during a second mode of operation of turbine engine 10.

One exemplary mode of operation of turbine engine 10 may comprise a start-up phase of turbine engine 10 during which high-pressure spool 24 is driven by a starter motor (not shown) and low-pressure spool 29 is either stationary or turning at relatively low speed. Accordingly, oil pump 44 may be driven during a start-up phase of turbine engine 10 so that oil may be supplied to one or more lubrication loads 39 before the start-up of low-pressure spool 29 to ensure that adequate lubrication is provided for the initial operation of bearings and other components of gear train system 36 and/or other part(s) of turbine engine 10. In some embodiments, it may be desirable to have a delay between the starting of oil pump 44 via pump motor 52 and the initial operation of bearings or other lubrication loads 39 to ensure that oil is supplied to the lubrication loads 39 before their operation. Such delay may be implemented via a control system of turbine engine 10. In some embodiments, such control system may comprise an electronic engine controller (EEC), which may be part of a full authority digital engine control (FADEC).

Another exemplary mode of operation of a hybrid gas/electric version of turbine engine 10 may comprise a situation where output shaft 32 is driven by main motor 50 via gear train system 36 or otherwise instead of or in addition to combustion gases driving low-pressure turbine 30. For example, in some embodiments, main motor 50 may be an electric motor configured to drive part or all of gear train system 36 so as to power load 22 via output shaft 32. Main motor 50 may be used in various situations including for example, before or during start-up of turbine engine 10, during flight or take-off of an aircraft to which turbine engine 10 is mounted to supplement the power produced by the combustion gases or during taxiing of an aircraft to which turbine engine 10 is mounted. In some situations, main motor 50 may be used to drive output shaft 32 at a relatively low speed. In various situations, main motor 50 may be used to drive output shaft 32 instead of or in addition to using turbine section 20 of turbine engine 10.

In various embodiments, oil pump 44 may be driven by a first source of motive power during a first mode of operation and by a second source of motive power during a second mode of operation. For example, oil system 12 may comprise pump motor 52 which may be serve as a first source of motive power to drive oil pump 44 during one or more modes of operation. Pump motor 52 may be an electric motor capable of operation as a generator as well and accordingly may be may be considered an electric motor/generator. In some embodiments, pump motor 52 may be dedicated to exclusively drive oil pump 52 and may optionally be operable as an electric generator as well. One or more electric power source(s) 54 may serve to power motors 50 and/or 52. Electric power source 54 may, for example, comprise one or more batteries located on or off of turbine engine 10. In some embodiments, electric power source 54 may comprise one or more (e.g., rechargeable) batteries onboard an aircraft to which turbine engine 10 may be mounted.

Oil system 12 may comprise coupling device 56 configured to transfer motive power from gear train system 36, which, when driven may serve as a second source of motive power for driving oil pump 44 during a second mode of operation. For example, coupling device 56 may be configured to transfer motive power from gear train system 36 to oil pump 44 during a mode of operation where oil pump 44 is driven by gear train system 36 instead of by pump motor 52. In some embodiments, oil pump 44 may be configured to receive motive power from accessory drive shaft 40 of gear train system 36 via coupling device 56. In some embodiments oil pump 44 and/or coupling device 56 may be mounted to an accessory pad of gear box 38.

Coupling device 56 may be configured so that accessory drive shaft 40 of gear train system 36 is drivingly engaged to oil pump 44 so as to drive oil pump 44 via accessory drive shaft 40 during the second mode of operation; and so that accessory drive shaft 40 of gear train system 36 is drivingly disengaged from oil pump 44 during another mode of operation during which oil pump 44 is driven by pump motor 52 instead of by accessory drive shaft 40. For example, the transfer of motive power from pump motor 52 to gear train system 36 may be substantially prevented during the first mode of operation where oil pump 44 is driven by pump motor 52. In various embodiments, coupling device 56 may comprise a suitable one-way rotation coupling device of known or other type such as, for example, a freewheeling (e.g., sprag, one-way) clutch. For example, coupling device 56 may be configured to transmit torque in one direction and allow idling (freewheel) in the opposite direction.

The arrangement of oil pump 44 being coupled to accessory drive shaft 40 via coupling device 56 in combination with the coupling of pump motor 52 to oil pump 44 may permit the automatic selection of which source of motive power drives oil pump 44 based on the operating speed of each source of motive power. For example, while pump motor 52 is driving oil pump 44, coupling device 56 may be configured to drivingly disengage gear train system 36 from oil pump 44 and thereby substantially prevent the transfer of motive power between gear train system 36 and oil pump 44 (and consequently between gear train system 36 and pump motor 52) when a driving speed (e.g., revolutions per minute) from pump motor 52 is higher than a driving speed (e.g., revolutions per minute) from accessory drive shaft 40 of gear train system 36. However, as the operating speed of gear train system 36 increases (e.g., during start-up of turbine engine) and the rotation speed of accessory drive shaft 40 becomes higher than the rotation speed of pump motor 52, coupling device 56 (e.g., sprag clutch) may cause engagement of oil pump 44 with accessory drive shaft 40 and thereby cause motive power to be transferred from accessory drive shaft 40 to oil pump 44. In some embodiments, coupling device 56 may be coupled to accessory drive shaft 40 via a splined coupling interface.

After transitioning from oil pump 44 being driven by pump motor 52 to oil pump 44 being driven by accessory drive shaft 40 of gear train system 36, pump motor 52 may no longer require to be driven by electric power source 54. In some embodiments, pump motor 52 may be drivingly disengaged from oil pump 44 and deactivated while oil pump 44 is driven by accessory drive shaft 40. Alternatively, in some embodiments, pump motor 52 may remain drivingly engaged to oil pump 44 or otherwise coupled to accessory drive shaft 40 so as to permit the transfer of motive power from accessory drive shaft 40 to pump motor 52 and thereby permit pump motor 52 to operate as an electric generator for the purpose of providing electrical power to one or more electrical loads on or off of turbine engine 10.

During the first mode of operation where oil pump 44 is driven by pump motor 52, electric power source 54 may be used to drive pump motor 52. However, during the second mode of operation where oil pump 44 is driven by accessory drive shaft 40, pump motor 52 may be operated as an electric generator to charge electric power source 54 (e.g., battery (ies)).

For a hybrid version of turbine engine 10, pump motor 52 may be used to drive oil pump 44 while main motor 50 drives output shaft 32 at a relatively low operating speed via gear train system 36 or otherwise. Accordingly, if the operating speed of gear train system 36 when being driven by main motor 50 is not sufficiently high to cause oil pump 44 to be driven by gear train system 36, oil pump 44 may still be driven by pump motor 52 so as to provide an adequate supply of oil to lubrication loads 39, which may operate within gear train system 36 for example. The operation of electric motors 52 and 50 may be controlled via a control system of turbine engine 10.

Figure 2:
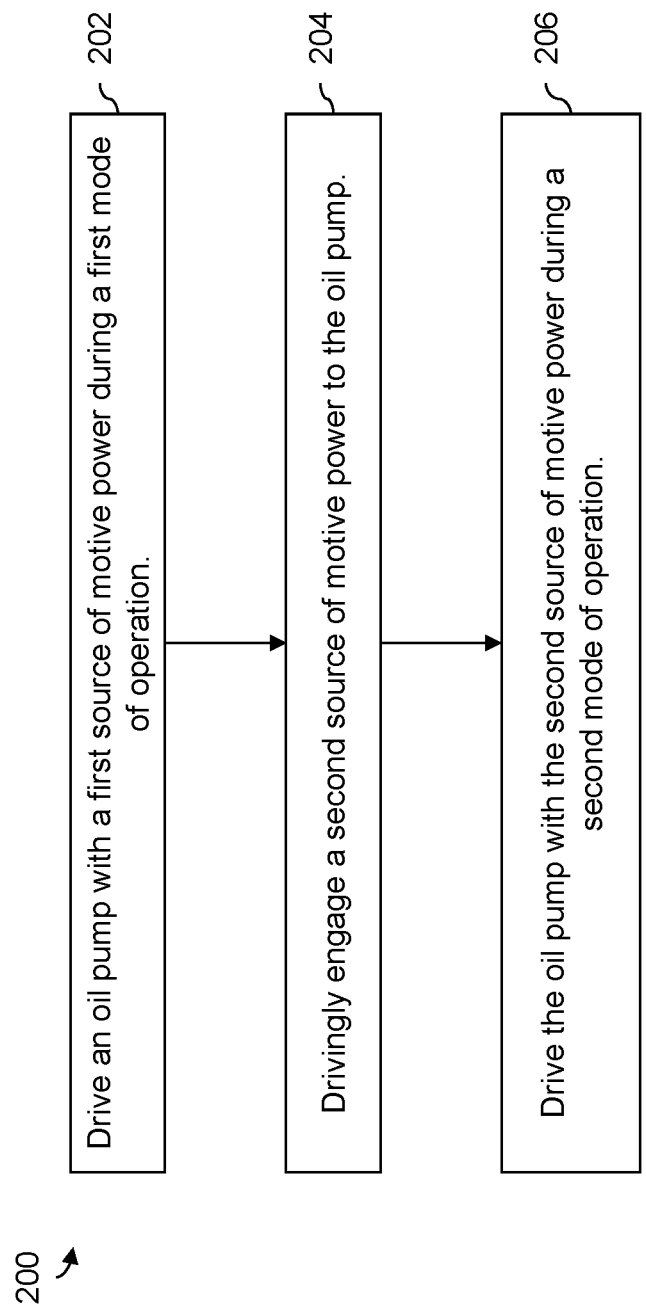
FIG. 2 is a flowchart illustrating a method for driving an oil pump of the oil system of FIG. 1.

FIG. 2 is a flowchart illustrating a method 200 for driving oil pump 44 in order to pressurize oil for delivery to one or more lubrication loads 39 of turbine engine 10. Method 200 may be performed using oil system 12 of turbine engine 10 shown in FIG. 1 and described above. In various embodiments, method 200 may comprise: driving oil pump 44 with a first source of motive power (e.g., pump motor 52) during a first mode of operation (e.g., when an operating speed of gear train system 36 is relatively low during start-up or during operation of main motor 50) (see block 202). In some embodiments, block 202 may be performed when oil pump 44 is drivingly disengaged from a second source of motive power (e.g., accessory drive shaft 40 of gear train system 36). Method 200 may also comprise: drivingly engaging the second source of motive power to oil pump 44 (see block 204); and driving oil pump 44 with the second source of motive power during a second mode of operation (see block 206).

As explained above, the first mode of operation may include a condition where a driving speed from the second source of motive power is lower than a driving speed from the first source of motive power. In other words, the first mode of operation may comprise a condition where a driving speed from the first source of motive power is higher than a driving speed from the second source of motive power. For example, this may correspond to a situation where a rotation speed of accessory drive shaft 40 is lower than a rotation speed of pump motor 52. The second mode of operation may include a condition where a driving speed from the second source of motive power is higher than a driving speed from the first source of motive power. For example, this may correspond to a situation where a rotation speed of accessory drive shaft 40 is higher than a rotation speed of pump motor 52. Accordingly, the first and second modes of operation may be determined based on the driving speed from accessory drive shaft 40 relative to the driving speed from pump motor 52.

It is understood that a speed-reducing or speed-increasing power-transfer device could be operationally disposed between pump motor 52 and oil pump 44 so the operating speed (e.g., revolutions per minute) of pump motor 52 may not necessarily correspond to the operating speed (e.g., revolutions per minute) of oil pump 44 in a one-to-one relationship. Similarly, is understood that a speed-reducing or speed-increasing power-transfer device could be operationally disposed between accessory drive shaft 40 and oil pump 44 so the operating speed (e.g., revolutions per minute) of accessory drive shaft 40 may not necessarily correspond to the operating speed (e.g., revolutions per minute) of oil pump 44 in a one-to-one relationship. Accordingly, the driving speeds from the first and second sources of motive power may correspond to driving speeds available at oil pump 44 from each source of motive power. For example, the driving speed from pump motor 52 may be a (e.g., rotational) driving speed available at oil pump 44 from pump motor 52. Similarly, the driving speed from gear train system 36 may be a (e.g., rotational) driving speed available at oil pump 44 from accessory drive shaft 40.

In some embodiments, method 200 may comprise transferring motive power from the second source of motive power to the first source of motive power during the second mode of operation. Since first source of motive power may comprise pump motor 52, which may be operated as a generator, method 200 may comprise operating pump motor 52 as a generator using motive power transferred from the second source of motive power (e.g., accessory drive shaft 40) during the second mode of operation. Electric power source 54, which may comprise one or more rechargeable batteries, may power pump motor 52 during the first mode of operation and be charged using electrical power generated by the operation of pump motor 52 as an electric generator during the second mode of operation.

The second source of motive power may include gear train system 36 (e.g., via accessory drive shaft 40) transferring motive power from low-pressure shaft 28 of turbine engine 10 to load 22 (e.g., a propeller) coupled to turbine engine 10.

In some embodiments, it may be desirable to implement a time delay between the starting of oil pump 44 via pump motor 52 and the initial operation of bearings or other lubrication loads 39 to ensure that oil is supplied to the lubrication loads 39 before their operation.

As explained above, gear train system 36 and/or output shaft 32 may, at times, be driven using main motor 50 (e.g., exclusively or cooperatively) in a hybrid version of turbine engine 10. Accordingly, method 200 may comprise driving gear train system 36 with main motor 50 during the first mode of operation and driving gear train system 36 with low-pressure turbine(s) 30 via low-pressure shaft 28 during the second mode of operation.

In various embodiments, oil system 12 may be configured to supply oil to one or more lubrication loads 39 when gear train system 36 is driven slower such as during a taxiing operation of an aircraft where a propeller may be driven at a slower speed (e.g., by main motor 50) to reduce noise for example. Also, the use of coupling device 56 may permit the switching from one source of motive power to another for driving oil pump 44 to be automatic depending on the operating speeds of both sources of motive power.

The above description is meant to be exemplary only, and one skilled in the relevant arts will recognize that changes may be made to the embodiments described without departing from the scope of the invention disclosed. For example, the blocks and/or operations in the flowchart and drawing described herein are for purposes of example only. There may be many variations to these blocks and/or operations without departing from the teachings of the present disclosure. For instance, blocks may be added, deleted, or modified. The present disclosure may be embodied in other specific forms without departing from the subject matter of the claims. Also, one skilled in the relevant arts will appreciate that while the systems and methods disclosed and shown herein may comprise a specific number of elements/components, the systems and methods could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A turboprop gas turbine engine comprising:
a shaft configured to be driven by a turbine;
a gear train system configured to transfer power from the shaft to a propeller coupled to the turbine engine; and
an oil system comprising:
an oil pump in fluid communication with one or more lubrication loads of the turbine engine;
a first electric motor drivingly engaged to the oil pump for driving the oil pump during a first mode of operation; and
a coupling device configured to:
drivingly disengage the gear train system from the oil pump during the first mode of operation; and
drivingly engage the gear train system to the oil pump to drive the oil pump with the gear train system during a second mode of operation.

2. The turboprop gas turbine engine as defined in claim 1, wherein the first electric motor is configured to operate as a generator and be driven by the gear train system during the second mode of operation.

3. The turboprop gas turbine engine as defined in claim 2, comprising a battery configured to power the first electric motor during the first mode of operation and be charged by the first electric motor operating as a generator during the second mode of operation.

4. The turboprop gas turbine engine as defined in claim 1, comprising a second electric motor configured to drive the gear train system during the first mode of operation.

5. The turboprop gas turbine engine as defined in claim 1, wherein the coupling device is configured to transfer motive power from the gear train system to the oil pump when a driving speed from the gear train system is higher than a driving speed from the first electric motor.

6. The turboprop gas turbine engine as defined in claim 1, wherein the coupling device is configured to drivingly engage and disengage an accessory drive shaft of the gear train system to and from the oil pump based on a rotational speed of the accessory drive shaft.

7. An oil system of a turbine engine, the oil system comprising:
an oil pump for fluid communication with one or more lubrication loads of the turbine engine;
a first source of motive power drivingly engaged to the oil pump for driving the oil pump during a first mode of operation; and
a coupling device configured to:
drivingly disengage a second source of motive power from the oil pump during the first mode of operation; and drivingly engage the second source of motive power to the oil pump to drive the oil pump with the second source of motive power during a second mode of operation.

8. The oil system as defined in claim 7, wherein the first source of motive power comprises an electric motor.

9. The oil system as defined in claim 8, wherein the electric motor is configured to operate as a generator and be driven by the second source of motive power during the second mode of operation.

10. The oil system as defined in claim 9, comprising a battery configured to power the electric motor during the first mode of operation and be charged by the electric motor operating as a generator during the second mode of operation.

11. The oil system as defined in claim 7, wherein the coupling device is configured to transfer motive power from the second source of motive power to the oil pump when a driving speed from the second source of motive power is higher than a driving speed from the first source of motive power.

12. The oil system as defined in claim 7, wherein the coupling device comprises a one-way rotation coupling device.

13. The oil system as defined in claim 7, wherein the coupling device comprises a sprag clutch.

14. The oil system as defined in claim 7, wherein the coupling device is configured to drivingly engage and disengage the second source of motive power to and from the oil pump based on an operational speed of the second source of motive power.

15. A method for driving an oil pump in fluid communication with one or more lubrication loads of a gas turbine engine, the method comprising:
    driving the oil pump with a first source of motive power during a first mode of operation where the oil pump is drivingly disengaged from a second source of motive power;
    drivingly engaging the second source of motive power to the oil pump; and
    driving the oil pump with the second source of motive power during a second mode of operation.

16. The method as defined in claim 15, wherein:
    the first mode of operation comprises a condition where a driving speed from the first source of motive power is higher than a driving speed from the second source of motive power; and
    the second mode of operation includes a condition where a driving speed from the second source of motive power is higher than a driving speed from the first source of motive power.

17. The method as defined in claim 15, wherein the second source of motive power comprises a gear train system configured to transfer motive power to a load applied to the turbine engine and the method comprises:
    driving the gear train system with an electric motor during the first mode of operation; and
    driving the gear train system with a shaft driven by a turbine during the second mode of operation.

18. The method as defined in claim 15, comprising transferring motive power from the second source of motive power to the first source of motive power during the second mode of operation.

19. The method as defined in claim 15, wherein the first source of motive power is an electric motor driven by an electric power source and the method comprises operating the electric motor as a generator during the second mode of operation to charge the electric power source.

20. The method as defined in claim 15, wherein the first source of motive power is an electric motor and the second source of motive power is a gear train system configured to transfer power from the gas turbine engine to a propeller coupled to the gas turbine engine.

* * * * *